US009491028B2

(12) United States Patent
Lee et al.

(10) Patent No.: US 9,491,028 B2
(45) Date of Patent: Nov. 8, 2016

(54) PHASE SYNCHRONIZATION OF MODULATION OR DEMODULATION FOR QAM-BASED MULTIBAND TSV-LINK

(71) Applicant: THE REGENTS OF THE UNIVERSITY OF CALIFORNIA, Oakland, CA (US)

(72) Inventors: Sheau Jiung Lee, Saratoga, CA (US); Yilei Li, Los Angeles, CA (US); Wei-Han Cho, Los Angeles, CA (US); Mau-Chung Frank Chang, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/949,165

(22) Filed: Nov. 23, 2015

(65) Prior Publication Data
US 2016/0149746 A1 May 26, 2016

Related U.S. Application Data

(63) Continuation of application No. PCT/US2014/035818, filed on Apr. 29, 2014.

(60) Provisional application No. 61/827,094, filed on May 24, 2013.

(51) Int. Cl.
H04L 7/00 (2006.01)
H04L 27/34 (2006.01)
(Continued)

(52) U.S. Cl.
CPC ......... *H04L 27/3455* (2013.01); *H04L 7/0331* (2013.01); *H04L 27/362* (2013.01);
(Continued)

(58) Field of Classification Search
CPC ... H04B 1/44; H04B 2001/485; H04L 1/243; H04L 27/3455; H04L 7/0331
USPC .................................. 375/219–222, 354–358
See application file for complete search history.

(56) References Cited

U.S. PATENT DOCUMENTS 5,794,119 A * 8/1998 Evans .................... H04N 7/173
 348/E5.096
6,707,863 B1 * 3/2004 Mrozek ............... H04L 27/3809
 329/308

(Continued)

OTHER PUBLICATIONS

Korean Intellectual Propert Office (KIPO), International Search Report and Written Opinion, PCT/US2014/035818, issued Apr. 29, 2014, pp. 1-10, with claims searched, pp. 11-15. Counterpart to application filed herewith.

(Continued)

*Primary Examiner* — Emmanuel Bayard
(74) *Attorney, Agent, or Firm* — O'Banion & Ritchey LLP; John P. O'Banion

(57) ABSTRACT

A chip-to-chip communications circuit which is particularly well-suited for short range wired RF communication from one integrated circuit (chip) to another is presented. The circuits preferably utilize multi-frequency quadrature amplitude modulation (QAM) mechanisms for converting digital data bits from a parallel form into a serial analog stream for communication over a chip I/O connection. During a phase calibration cycle, a phase adjustment controller in the transmitter interoperates with a phase adjustment controller in the receiver, to adjust a phase locked-loop (PLL) circuit to correct for the phase delay arising in response to signal propagation between transmitter and receiver.

20 Claims, 4 Drawing Sheets

(51) Int. Cl.
*H04L 27/36* (2006.01)
*H04L 27/38* (2006.01)
*H04L 7/033* (2006.01)
*H04L 27/00* (2006.01)

(52) U.S. Cl.
CPC ......... *H04L27/364* (2013.01); *H04L 27/3872* (2013.01); *H04L 2027/0022* (2013.01); *H04L 2027/0028* (2013.01); *H04L 2027/0055* (2013.01); *H04L 2027/0067* (2013.01)

(56) References Cited

U.S. PATENT DOCUMENTS

| | | | | |
|---|---|---|---|---|
| 6,980,589 B1* | 12/2005 | Babb | ....... | H03J 1/005 375/222 |
| 6,982,922 B2* | 1/2006 | Stark | ....... | G06F 13/4217 365/194 |
| 7,042,923 B1* | 5/2006 | McCrank | ....... | H04B 1/7136 370/437 |
| 7,555,048 B1 | 6/2009 | Massoumi et al. | | |
| 8,391,397 B2* | 3/2013 | Zhang | ....... | H04B 7/0617 375/267 |
| 8,538,346 B2* | 9/2013 | Arai | ....... | H03J 7/04 375/232 |
| 8,971,210 B1* | 3/2015 | Murali | ....... | H04B 7/0413 370/254 |
| 8,988,993 B2* | 3/2015 | Mihota | ....... | H04B 7/0697 370/229 |
| 9,097,791 B2* | 8/2015 | Kishigami | ....... | G01S 7/285 |
| 9,287,960 B2* | 3/2016 | Kishimoto | ....... | H04B 7/0682 |
| 2003/0228854 A1* | 12/2003 | Morris | ....... | H04W 52/143 455/139 |
| 2009/0168860 A1 | 7/2009 | Magagni et al. | | |
| 2010/0002795 A1 | 1/2010 | Raghavan et al. | | |
| 2013/0044552 A1 | 2/2013 | Best | | |

OTHER PUBLICATIONS

Cristian Marcu et al., "A 90 nm CMOS Low-Power 60 GHz Transceiver With Integrated Baseband Circuitry", IEEE Journal of Solid-State Circuits, vol. 44, No. 12, Dec. 2009, pp. 3434-3447.

* cited by examiner

PHASE SYNCHRONIZATION OF MODULATION OR DEMODULATION FOR QAM-BASED MULTIBAND TSV-LINK

CROSS-REFERENCE TO RELATED APPLICATIONS

This application is a 35 U.S.C. §111(a) continuation of PCT international application number PCT/US2014/035818 filed on Apr. 29, 2014, incorporated herein by reference in its entirety, which claims priority to, and the benefit of, U.S. provisional patent application Ser. No. 61/827,094 filed on May 24, 2013, incorporated herein by reference in its entirety. Priority is claimed to each of the foregoing applications.

The above-referenced PCT international application was published as PCT International Publication No. WO 2014/189651 on Nov. 27, 2014, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technical Field

This technology pertains generally to chip-to-chip communication, and more particularly to phase-synchronization in short-range chip-to-chip communication utilizing differential current mode multiple-frequency modulation-demodulation.

2. Background Discussion

Serial I/O between integrated circuit "chips," or other devices, is typically based on multiplexing and demultiplexing digital communications. To increase communications bandwidth using these conventional schemes, one first turns to increasing the clock rate. However, each process technology has its own limitations on clock rates, whereby one must often increase the number of I/O connections to increase the bandwidth, and as a result manufacturing costs increase. These costs are even further increased in 3D integrated circuit integration, such as those based on through-substrate-via (TSV) for vertical interconnections. The number of TSVs for the I/O is non-scalable due to fundamental physical or mechanical constraints. Higher than a certain number of TSVs per unit area (or population density) leads to thinned Si substrate (about 100 µm/tier) which can result in collapse. Therefore, this thinning can seriously limit inter-tier communication bandwidth in 3D integrated circuits.

Thus, chip-to-chip communication circuits with higher communication bandwidths have been sought which do not require concurrent increases in the clock rate or additional I/O connections.

However, problems arise with these circuits when used in radio frequency (RF) communications in regard to phase synchronization for optimizing signal strength recovery. Existing methods to perform this phase synchronization between modulation and demodulation is performed utilizing digital signal processing and requiring complex circuitry which is subject to high power consumption levels. Although this traditional method offers flexibility of phase tuning capability by using software DSP, its long latency and large hardware overhead make the approach less preferable for short latency, low power, and simple circuit topologies, such as required for mobile and micro-server applications.

Accordingly, our technology described below provides enhanced multiple-band modulation and demodulation synchronization for RF communications, such as for chip-to-chip TSV-link communications.

BRIEF SUMMARY OF THE TECHNOLOGY

A phase synchronization method and apparatus is presented which is particularly well-suited for use in synchronizing modulation and demodulation in multiple-band (frequency) chip-to-chip communications, such as QAM-based multiband through-silicon-via (TSV)-links. The method utilizes a combination of predefined signal patterns sent by a transmit controller, a set of digital codes for adjusting phase delay of a phase locked loop (PLL) controlling phase in the demodulator, a phase adjustment controller configured for validating the correctness of demodulator output, and a phase adjustment controller having programming for asserting a digital code to achieve maximum recovered signal strength based on its recorded correct digital code during the phase adjustment cycle.

The phase adjustment method presented provides beneficially short latency, simple circuit topology and low power consumption. The presently described synchronization apparatus/method combines the action of a phase adjustment controller and a transmission controller to perform the needed phase adjustment without the need for digital signal processing.

Further aspects of our technology will be brought out in the following portions of the specification, wherein the detailed description is for the purpose of fully disclosing preferred embodiments of our technology without placing limitations thereon.

BRIEF DESCRIPTION OF THE SEVERAL VIEWS OF THE DRAWING(S)

The technology will be more fully understood by reference to the following drawings which are for illustrative purposes only:

DETAILED DESCRIPTION OF THE TECHNOLOGY

Figure 1A:
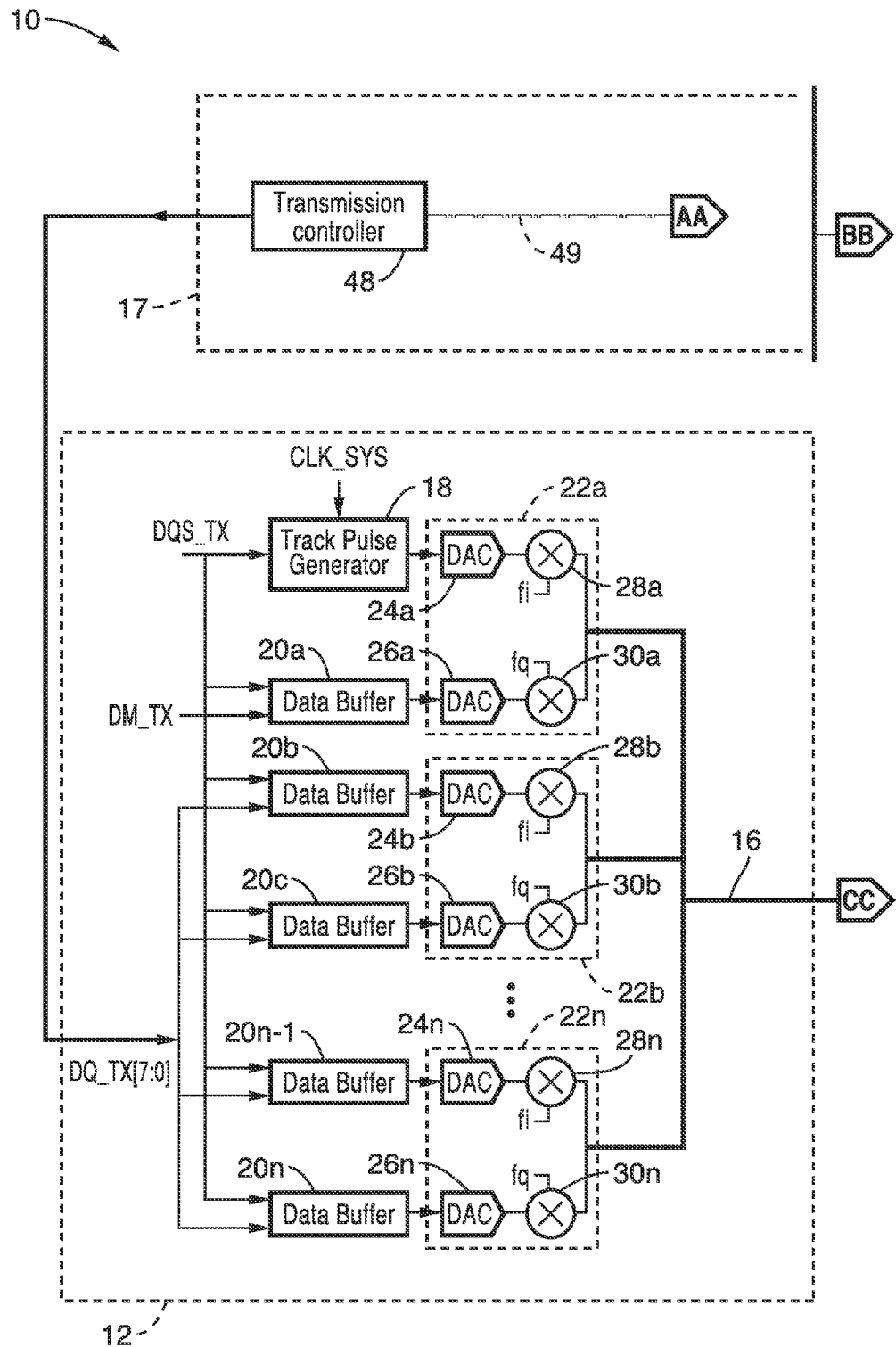
FIG. 1A and FIG. 1B are a schematic block diagram for an RF modulation and demodulation communication apparatus according to an embodiment of our technology.

Synchronization between modulation and demodulation is described for use in short-range chip-to-chip wired RF communication. The inventive apparatus, system and method provides a number of advantages, including lower power, lower latency, higher interference tolerance between neighboring through-Silicon-vias (TSVs).

Phase synchronization between modulation and demodulation carriers in RF communications is traditionally carried out through the use of digital signal processing. The demodulated signal is down converted to baseband and digitized by analog-to-digital converter. Then a digital signal processor (DSP) is utilized to perform the phase synchronization for the demodulated signal by using a digital-lock-loop (DLL) circuit. This conventional method requires a complicated algorithm implemented in DSP, which increases not only the latency of signal processing but also the power consumption.

In the presently described technology, a new method is described for performing phase synchronization between the modulation at the transmitter (Tx) and demodulation at the receiver (Rx). This method can perform synchronization without the need of complicated DSP circuits and it achieves a short latency with low power consumption. Phase synchronization is achieved herein by sending a pre-defined data pattern and a set of digital codes from a transmission controller (Tx) to adjust the phase delay of a phase-lock-loop (PLL) that interoperates in generating the demodulation carrier to the demodulation mixer. Consequently, a phase synchronization controller is utilized for monitoring the demodulator output and to validate the correctness of output for each digital code. When a complete set of digital codes is tested, the phase synchronization controller asserts correct phase adjustment to achieve the maximum recovered signal strength.

Phase adjustments in this approach are accomplished based on a predefined protocol between a transmission controller and a phase adjustment controller. The phase adjustments are performed in response to combining: (1) a predefined signal pattern sent by a transmit controller; (2) a set of digital codes to adjust the phase delay of a PLL; (3) a phase adjustment controller to validate the correctness of demodulator output; and (4) a phase adjustment controller with programming configured to assert a digital code to achieve the maximum recovered signal strength based on its recorded correct digital code during the phase adjustment cycle.

This phase adjustment can be performed without bearing the traditional heavy overhead required by digital signal processing. By eliminating the need of the DSP circuitry, signal propagation latencies can be reduced by removing the digital-locked-loop (DLL) used to synchronize the carrier phase between modulation and demodulation. The simplicity of circuit implementation also can lead to substantial reductions in power consumption compared with that of a synchronization circuit relying on a digital signal processor.

The method may be implemented in a number of device technologies to suit a wide range of RF communication applications. In at least one embodiment, a phase adjustment chip can be fabricated in a 28 nm CMOS process, and this may be further scaled using silicon process technology.

Figure 1B:
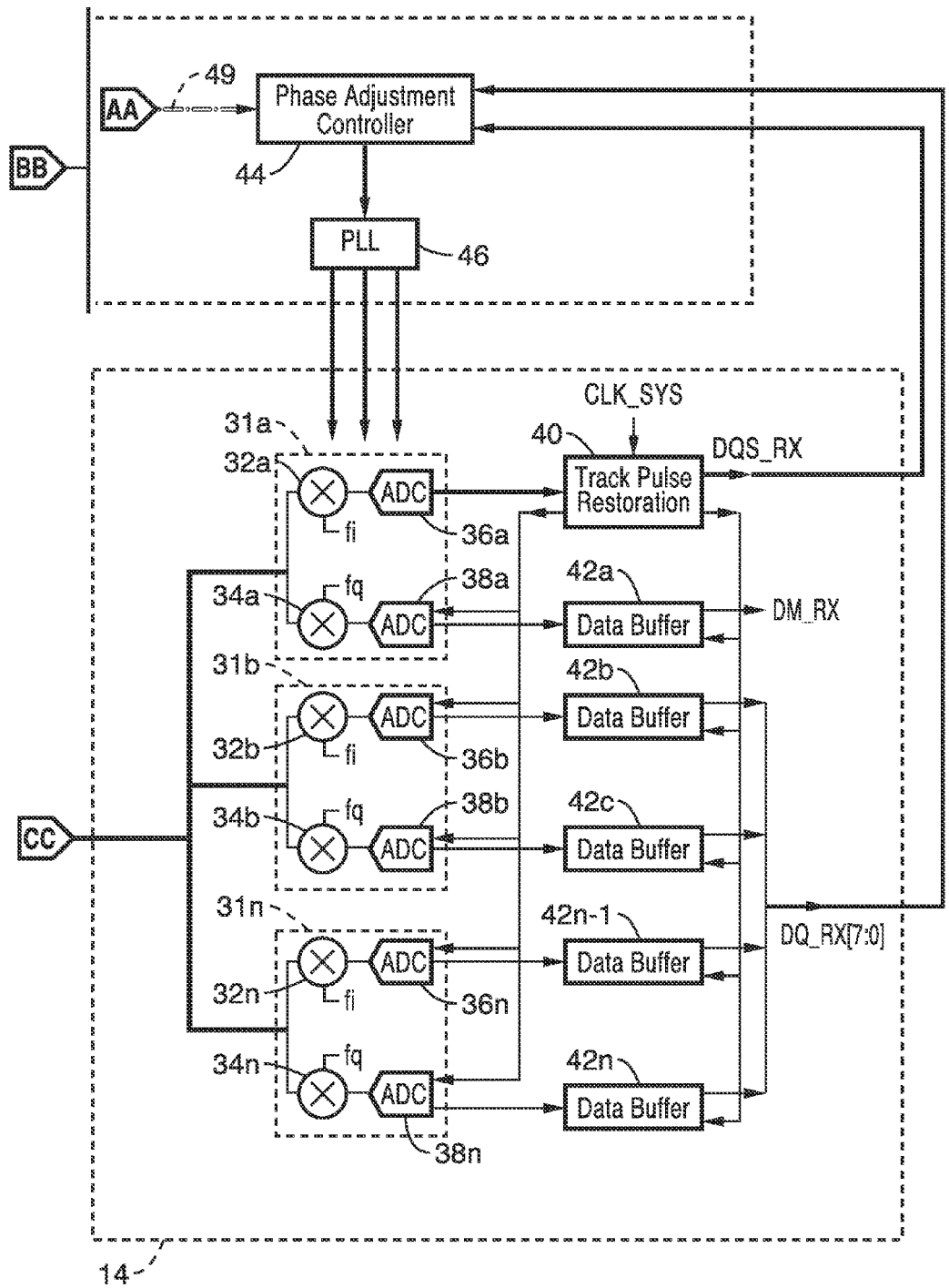

FIG. 1A and FIG. 1B illustrate an example embodiment 10, of circuit blocks for a synchronization between modulation and demodulation within a multiple-frequency communication circuit, such as utilizing multi-frequency band quadrature-amplitude modulation (QAM), for inter-chip communication between multiple chips communicating a short distance, such as in a multi-band TSV-link.

The modulation and demodulation circuit 10 comprises modulation circuits to perform transmission (Tx) 12, and demodulation circuits to perform reception (Rx) 14, between which are seen a communication connection 16, in the form of a wired RF analog serial bus. Controlling the synchronization of the transmit and receiver portions are a synchronization circuit 17 having a phase adjustment controller 44, phase-locked loop 46, and transmission controller 48.

The transmit side 12 is shown receiving data over a data bus, exemplified as, but not limited to, an 8-bit wide bus (DQ_TX[7:0]), as received from transmission controller 48. A device mode signal (DM_TX), a transmitter latching signal DQS_TX, and a clock signal (CLK_SYS), are also seen on the transmit side. It should be noted that the path 49 seen from transmission controller 48 in FIG. 1A to the phase adjustment controller 44 in FIG. 1B, over which the digital code sent, is symbolic. In actuality these digital codes are preferably sent by the transmission controller sending codes which are modulated and sent by the transmitter 12 and received in receiver 14, recognized as synchronization codes, and passed to the phase adjustment controller 44.

In the modulator of the transmission side are seen a track pulse generator 18 that is seen coupled in a first stage with a plurality of data buffers 20a through 20n. Output from the pulse generator 18 and data buffers 20a through 20n, is seen received by QAM circuits 22a through 22n. Track pulse generation provides a mechanism for data synchronization between the transmitter and receiver. A track pulse is transmitted to the receiver which is utilized for controlling the data buffers for the DM_RX bit as well as for data bits DQ_RX[7:0]. The outputs from DM_RX and DQ_RX[7:0] are seen coupled to phase adjustment controller 44 coupled to phase-locked loop 46, shown coupled to the mixers in the demodulator.

Each QAM circuit (22a through 22n), is seen exemplified as comprising digital-to-analog converters (DACs) 24a, 26a, 24b, 26b, . . . 24n, 26n, followed by mixers 28a, 30a, 28b, 30b, . . . 28n, 30n, with each pair of mixers receiving an f, and $f_q$ signal.

Receiver side 14 is shown with similar signals, as were seen in the transmit side, while it outputs data over a data bus, exemplified, but not limited to, an 8-bit wide bus (DQ_RX[7:0]), it also outputs a device mode signal (DM_RX), an output status signal DQS_RX, and a clock signal (CLK_SYS). The demodulation circuit in the receiver 14 is substantially the reverse of that seen in the transmit side 12. A signal is received from analog serial bus 16 to a number of QAM circuits 31a, 31b, . . . 31n, comprising mixers 32a, 34a, 32b, 34b, . . . 32n, 34n, each pair receiving f, and $f_q$ signals. Output from the mixers is converted to digital signals by pairs of analog-to-digital converters (ADC) 36a, 38a, 36b, 38b, . . . 36n, 38n, with each mixer output coupled to the input of the ADC. Digital outputs from the ADCs are received at a track pulse restoration circuit 40 along with data buffers 42a, 42b, 42c, . . . 42n-1, 42n. The output of track pulse restoration circuit 40 is output as DQS_RX, and another portion connected to each of the data buffers 42a, 42b, 42c, . . . 42n-1, 42n. Output from the first data buffer 42a, generates signal DM_RX, while output from the remaining data buffers is output on signal DQ_RX [7:0]. DQ_RX[7:0] and DM_RX are shown coupled to phase adjustment controller 44.

The circuit transmits a byte of digital signals after applying multi-frequency modulation and combining mixer outputs to transmit a modulated multi-frequency analog transmission from transmitter 12. The receiver circuit 14 receives this multi-frequency analog signal and applies a multi-frequency demodulation to the combined signal from transmitter 12 from which it extracts the digital data as was originally encoded by transmitter 12.

It will be appreciated that both the modulation and demodulation mixers require a mixing carrier with a selected frequency to mix with the data signals. In performing RF communication, it should also be appreciated that the modulation carrier and the demodulation carrier need to be in phase so that the strength of the recovered signal after demodulation is maximized.

The modulation mixers and demodulation mixers seen in FIG. 1A and FIG. 1B, respectively, are incorporated into different chips which are communicating with each other through wire connections. The modulated signal after mixing in a first chip (e.g., transmitter) is configured for traveling through a pad on that first chip to the connection channel, such as through-silicon-via (TSV) or metal wire trace, to operably interconnect with pads on a second chip (e.g., receiver). The pad circuit of the connected chip aids in further propagating the signal to the demodulated mixer for down converting data signal to base frequency band signal. It will be recognized that between the modulation mixer in one chip, and the demodulation mixer in another chip, there exists a phase delay due to signal propagation through various elements of the interconnection. In order to maximize the strength of the recovered signal, one must adjust the phase between the modulation mixer and demodulation mixer to compensate for the phase delay arising from signal propagation. When in phase calibration mode, the digital code for transmission is a fixed pattern and is known a priori by phase adjustment controller. Thus, phase adjustment controller can detect the output from RX to know whether the phase adjustment is correct or not.

Instead of performing phase adjustment by digital signal processing, the presently presented technology implements a scheme utilizing a synchronization circuit 17, exemplified as comprising a transmission controller 48 and a phase adjustment controller 44 that performs digital control of a phase-locked-loop (PLL) circuit 46. The phase adjustment controller is configured to adjust the phase of the mixer based on a set of programmed steps to maximize the strength of recovered signal.

It should be appreciated that a variety of forms of QAM are available and can be utilized with our technology, some of the more common forms that can be selected for use include: QAM8, QAM16, QAM32, QAM64, QAM128, and QAM256. It will be appreciated that QAM distributes information in the I-Q plane evenly, and the higher orders of QAM involve information spaced more closely in the constellation. Thus, higher order QAM allows transmitting more bits per symbol, but if the energy of the constellation is to remain the same, the points on the constellation are closer together and the transmission becomes more susceptible to noise. It should also be appreciated that modulation and demodulation can be performed according to the presently presented technology utilizing other forms of multi-frequency analog modulation-demodulation. Examples of other forms of multi-frequency modulation which can be utilized include pulse-width modulation (PWM), frequency-shift keying (FSK), frequency-hopping, spread spectrum, and so forth.

One of ordinary skill in the art will appreciate that the described control signals, including DQS_TX, DM_TX, and the various clock signals such as CLK_SYS, CLK_N, CLK_P, CLKN_P, and CLKN_N can be generated, the transmitter controlled, and phase adjusted in the demodulator (receiver) utilizing circuitry in a variety of ways without departing from our technology. For example, the use of dedicated digital circuits, timing/oscillator circuits, gate arrays, programmable logic arrays, computer circuits (with associated memory), and other circuitry capable of generating control logic, while combinations of these circuit types may also be utilized without limitation. It will be appreciated, for example, that the phase adjustment controller 44 and transmission controller 48 may each utilize a computer processor (e.g., CPU, microprocessor, microcontroller), coupled with memory from which programming is executed for carrying out the steps depicted in the following flow diagram. It will be seen that these steps are not that of digital signal processing, which requires significantly increased processing power and overhead. It should be appreciated that programming for executing functions in the transmission controller and phase adjustment controller, respectively, may be stored on any desired form of memory, including solid state memory and computer-readable media. Our technology is non-limiting with regard to forms of memory and computer-readable media utilized, insofar as these are non-transitory, and thus not constituting a transitory electronic signal.

Figure 2A:
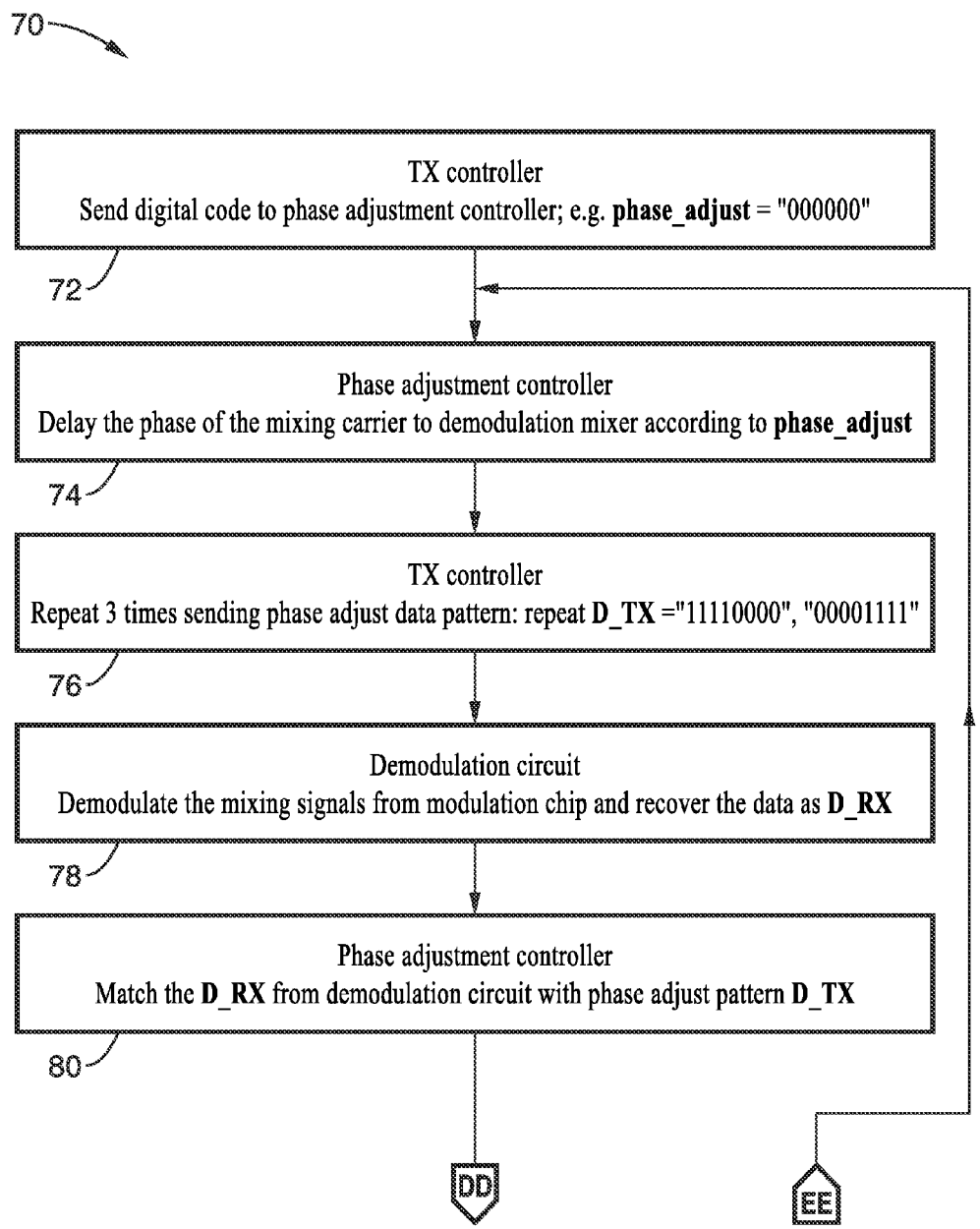
FIG. 2A and FIG. 2B are a flow diagram for modulation and demodulation synchronization performed according to an embodiment of our technology.
Figure 2B:
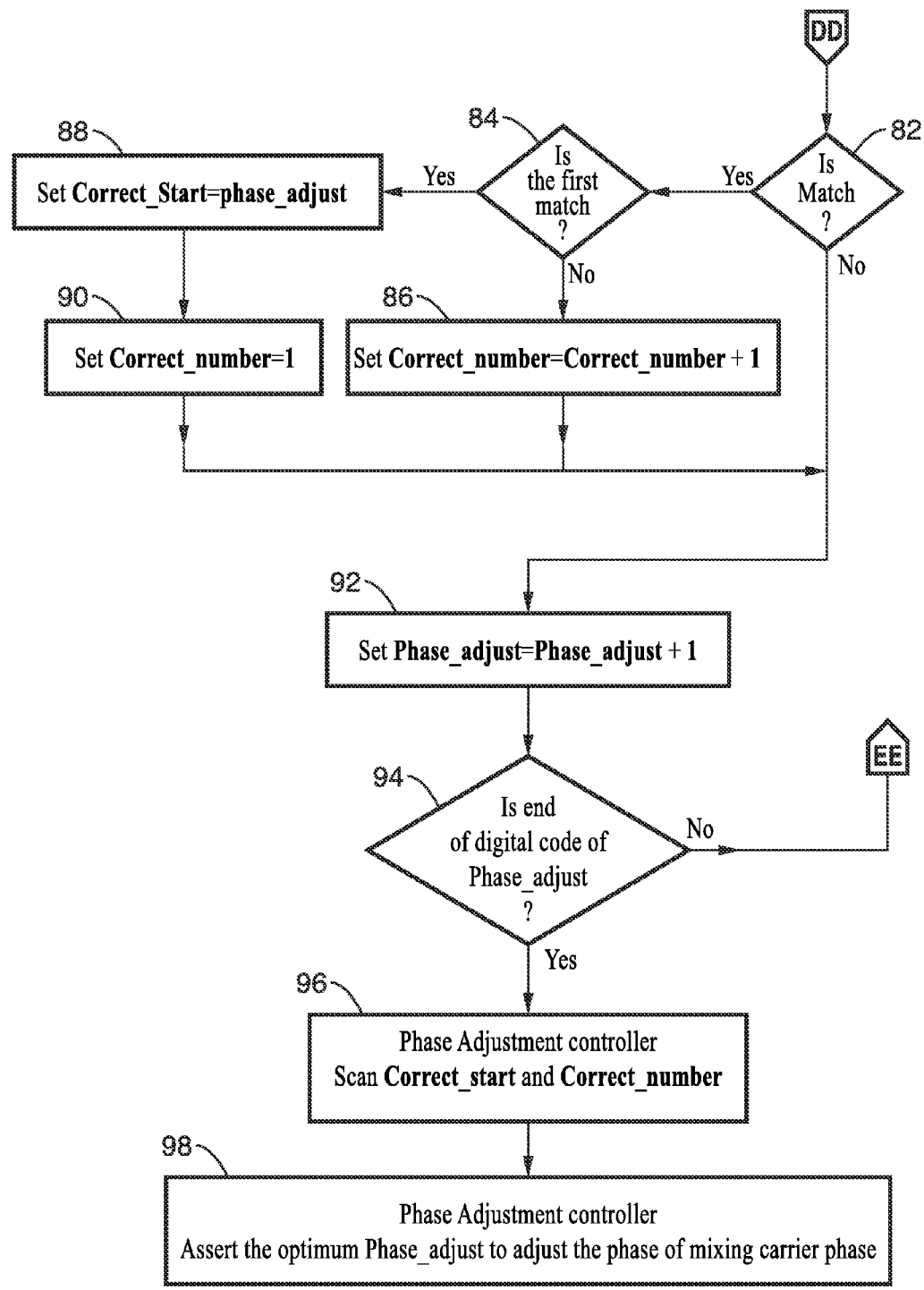

FIG. 2A and FIG. 2B illustrate an example embodiment 70 of program steps for performing phase adjustment in the presently presented technology. The transmission controller sends 72 a predefined phase adjust data pattern to D_TX, and a set of digital codes to the phase adjustment controller to adjust the phase delay of a phase locked loop, such as phase adjust code="000000". The phase adjustment controller is configured to adjust 74 the phase difference of the mixing carrier, and to repeat 76 this for each different digital code, such as D_TX="11110000", "00001111", etc. The mixing carrier with phase delay is applied 78 to the mixer in the demodulator, with output data D_RX from the demodulator fed back to the phase adjustment controller. The phase adjustment controller checks 80 if the output data D_RX matches 82 the predefined phase adjust data pattern, and records all check comparison results of phase adjust data pattern. The phase adjustment controller examines the comparison result and asserts the optimum phase delay for the PLL to maximize strength of the recovered signal. If there is no match in step 82, then the phase adjustment is incremented 92, such as Phase_adjust=Phase_adjust+1, followed by checking 94 if this is the end of the digital codes for the phase adjustment. If it is not the end of the digital codes for phase adjustment, then a return is made to step 74 with the phase adjustment controller, otherwise the phase adjustment controller does a scan to assure a Correct_start and Correct_number 96, followed by asserting an optimum Phase_adjust to adjust the phase of mixing carrier phase 98.

If a match arises from step 82, then a check is made 84 if this is a first match. If it is not a first match, as determined at block 84, then the Correct_number is advanced 86 to Correct_number+1, followed by setting phase adjust starting at step 92. If it is a first match as determined at block 84, then Correct_start is set 88 to phase_adjust and Correct_number set to 1, 90, followed by setting phase adjust starting at step 92. It should be readily recognized that the above programming steps are readily executable on even very simple processors, and do not require any digital signal processing to be performed.

During the phase adjustment cycles, the phase adjustment controller implements a set of registers to record the adjustment results. One is to record which digital code of phase adjustment starts to produce the correct recovered data pattern matching the phase adjust data pattern from the transmission controller. Then another register is used for recording how many consecutive digital codes will produce the correct recovered data pattern. When all possible digital codes of the phase adjust are exercised, the phase adjustment controller will scan the registers. By way of example, programming which executes a linear algorithm can be applied to achieve the optimum phase adjustment. That is, the digital code of the optimum phase adjustment is set to be the Correct_start+Correct_number/2. This digital code can produce the highest signal strength after demodulation if the system behaves linearly. It is thus preferable that the delay element in the PLL perform linearly as digital code of phase adjust changes.

The technology presented herein thus provides an enhanced method and apparatus for obtaining modulation and demodulation synchronization of phase adjustment for a multi-frequency communication circuit without the need of complicated digital signal processing. The phase adjustment can be performed according to simple programming steps in which the transmission controller interoperates (cooperative operation) with the phase adjustment controller. As both the transmission controller and the phase adjustment controller are in parallel with the signal path of modulation/demodulation, there are no additional penalties of signal propagation. This phase adjustment cycle can be started whenever the central processing unit determines there is a need of phase adjustment. Both transmission controller and phase adjustment controller are idle without consuming power during the normal operation of the modulator and demodulator.

From the discussion above it will be appreciated that our technology can be embodied in various ways, including but not limited to the following:

1. An apparatus for obtaining phase synchronization between modulation at a transmitter and demodulation at a receiver, comprising: (a) a modulation circuit within a transmitter configured for modulating digital data into a multiple-frequency analog signal output; (b) a demodulation circuit within a receiver configured for demodulating the multiple-frequency analog signal from said transmitter back into digital data; (c) a transmission controller coupled to said modulation circuit for controlling a phase adjustment cycle between said transmitter and said receiver; and (d) a phase adjustment controller coupled for receiving outputs from said demodulation circuit and for controlling phase of a phase-locked loop circuit coupled to multiple-frequency mixers in said demodulation circuit; (e) wherein during a phase adjustment cycle, predefined signal patterns are sent by said transmission controller to said phase adjustment controller, from which an optimum phase adjustment is determined for said phase-locked loop circuit controlling demodulation mixers in said demodulation circuit.

2. The apparatus of any of the previous embodiments, wherein said phase adjustment controller is configured for validating correctness of demodulator output toward achieving maximum recovered signal strength based on performing said phase adjustment cycle.

3. The apparatus of any of the previous embodiments, wherein said phase adjustment cycle is performed periodically toward assuring proper synchronization between transmitter and receiver.

4. The apparatus of any of the previous embodiments, wherein synchronization between modulation and demodulation is achieved without performing digital signal processing (DSP).

5. The apparatus of any of the previous embodiments, wherein phase synchronization is provided, between modulation in the transmitter and demodulation in the receiver, with reduced latency, or reduced power consumption, or a combination of reduced latency and reduced power consumption.

6. The apparatus of any of the previous embodiments, wherein said transmitter and said receiver are located on different integrated circuits which are interconnected.

7. The apparatus of any of the previous embodiments, wherein different integrated circuits are interconnected in response to connection of through-silicon-vias (TSVs) on their respective different integrated circuits which are interconnected.

8. The apparatus of any of the previous embodiments, wherein a phase delay arises due to signal propagation through various elements between modulation in the transmitter of a first integrated circuit and demodulation in the receiver of a second integrated circuit.

9. The apparatus of any of the previous embodiments, wherein said apparatus utilizes quadrature amplitude modulation (QAM) and (QAM) demodulation through-silicon via (TSV) links.

10. The apparatus of any of the previous embodiments: wherein said transmission controller sends a predefined phase adjust data pattern through DM_TX for receipt by said receiver and its phase adjustment controller; wherein said transmission controller sends a set of digital codes to the phase adjustment controller to adjust phase delay of a phase lock loop (PLL) in the demodulator of said receiver; wherein said phase adjustment controller controls phase difference of a mixing carrier for each different digital code, so that said mixing carrier with phase delay is applied to the demodulation mixers in the demodulator; wherein output data DM_RX from the demodulator is fed back to the phase adjustment controller; wherein the phase adjustment controller checks if output data DM _RX matches a predefined phase adjust data pattern and records all check comparison results of the phase adjust data pattern; and wherein the phase adjustment controller compares check comparison results and asserts optimum phase delay to the PLL to maximize recovered signal strength.

11. A method of performing phase synchronization between modulation at a transmitter and demodulation at a receiver, the method comprising: (a) sending a pre-defined data pattern and a set of digital codes from a transmission controller within a transmitter configured for multiple-frequency modulation of digital data into a multiple-frequency analog output; (b) receiving said pre-defined data pattern and a set of digital codes at a phase adjustment controller within a receiver configured for demodulation of said multiple-frequency analog output from said transmitter into a digital output; (c) adjusting phase delay of a phase-lock-loop (PLL) within said phase adjustment controller in response to said pre-defined data pattern and set of digital codes to generate a demodulation carrier to a demodulation mixer within the receiver; (d) validating correctness of demodulation mixer output for each digital code within set of digital codes; and (e) asserting correct phase adjustment within the phase adjustment controller to optimize the demodulation carrier for maximum recovered signal strength of the demodulator after testing all of said set of digital codes, whereby said demodulation in the receiver is then properly synchronized with modulation at the transmitter.

12. The method of any of the previous embodiments, wherein said method provides synchronization without performing digital signal processing (DSP).

13. The method of any of the previous embodiments, wherein said method provides synchronization between modulation and demodulation with reduced latency, or reduced power consumption, or a combination of reduced latency and reduced power consumption.

14. The method of any of the previous embodiments, wherein said transmitter and said receiver are located on different integrated circuits which are interconnected.

15. The method of any of the previous embodiments, wherein different integrated circuits are interconnected in response to connection of through-silicon-vias (TSVs) on their respective different integrated circuits.

16. The method of any of the previous embodiments, wherein a phase delay arises due to signal propagation through various elements between mixers in the transmitter of a first integrated circuit and mixers in the receiver of a second integrated circuit.

17. The method of any of the previous embodiments, wherein said method performs multiple-frequency modulation based on quadrature amplitude modulation (QAM) through-silicon via (TSV) links.

18. A method of performing phase synchronization between modulation at a transmitter and demodulation at a receiver, the method comprising: (a) sending a pre-defined phase adjust data pattern from a transmission controller of a transmitter to be output from a modulation mixer of the transmitter; (b) sending a set of digital codes from the transmission controller to a phase adjustment controller of a receiver, said set of digital codes adjust phase delay of a phase lock loop (PLL) in said phase adjustment controller; (c) controlling phase difference of a mixing carrier of the receiver based on output of said phase lock loop (PLL) for each different digital code in the set of digital codes; (d) applying mixing carrier with phase delay to a demodulation mixer of the receiver with demodulated output from the demodulation mixer fed back to the phase adjustment controller; (e) checking demodulated output within the phase adjustment controller for matching with pre-defined phase adjust data and storing results; and (f) examining stored results after storing data for all pre-defined phase adjust data and selecting optimum phase delay for the PLL, controlling demodulation mixers in said demodulation circuit, to maximize recovered signal strength and thus to phase synchronize demodulation at the receiver with modulation at the transmitter.

19. The method of any of the previous embodiments, wherein said phase adjustment cycle is performed periodically toward assuring proper phase synchronization between transmitter and receiver.

20. The method of any of the previous embodiments, wherein phase synchronization between modulation and demodulation is achieved without digital signal processing (DSP).

Embodiments of our technology may be described with reference to flowchart illustrations of methods and systems according to embodiments of our technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

Although the description above contains many details, these should not be construed as limiting the scope of the technology but as merely providing illustrations of some of the presently preferred embodiments of this technology. Therefore, it will be appreciated that the scope of the technology fully encompasses other embodiments which may become obvious to those skilled in the art, and that the scope of the technology is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology, for it to be encompassed by the present claims. Furthermore, no element, component, or method step described herein is intended to be dedicated to the public regardless of whether the element, component, or method step is explicitly recited in the claims. No claim element herein is to be construed under the provisions of 35 U.S.C. 112 unless the element is expressly recited using the phrase "means for."

What is claimed is:

1. An apparatus for obtaining phase synchronization between modulation at a transmitter and demodulation at a receiver, comprising:
   (a) a modulation circuit within a transmitter configured for modulating digital data into a multiple-frequency analog signal output;

(b) a demodulation circuit within a receiver configured for demodulating the multiple-frequency analog signal from said transmitter back into digital data;

(c) a transmission controller coupled to said modulation circuit for controlling a phase adjustment cycle between said transmitter and said receiver; and (d) a phase adjustment controller coupled for receiving outputs from said demodulation circuit and for controlling phase of a phase-locked loop circuit coupled to multiple-frequency mixers in said demodulation circuit;

(e) wherein during a phase adjustment cycle, predefined signal patterns are sent by said transmission controller to said phase adjustment controller, from which an optimum phase adjustment is determined for said phase-locked loop circuit controlling demodulation mixers in said demodulation circuit.

2. The apparatus recited in claim 1, wherein said phase adjustment controller is configured for validating correctness of demodulator output toward achieving maximum recovered signal strength based on performing said phase adjustment cycle.

3. The apparatus recited in claim 1, wherein said phase adjustment cycle is performed periodically toward assuring proper synchronization between transmitter and receiver.

4. The apparatus recited in claim 1, wherein synchronization between modulation and demodulation is achieved without performing digital signal processing (DSP).

5. The apparatus recited in claim 1, wherein phase synchronization is provided, between modulation in the transmitter and demodulation in the receiver, with reduced latency, or reduced power consumption, or a combination of reduced latency and reduced power consumption.

6. The apparatus recited in claim 1, wherein said transmitter and said receiver are located on different integrated circuits which are interconnected.

7. The apparatus recited in claim 6, wherein different integrated circuits are interconnected in response to connection of through-silicon-vias (TSVs) on their respective different integrated circuits which are interconnected.

8. The apparatus recited in claim 1, wherein a phase delay arises due to signal propagation through various elements between modulation in the transmitter of a first integrated circuit and demodulation in the receiver of a second integrated circuit.

9. The apparatus recited in claim 1, wherein said apparatus utilizes quadrature amplitude modulation (QAM) and (QAM) demodulation through-silicon via (TSV) links.

10. The apparatus recited in claim 1:
wherein said transmission controller sends a predefined phase adjust data pattern through DM_TX for receipt by said receiver and its phase adjustment controller;
wherein said transmission controller sends a set of digital codes to the phase adjustment controller to adjust phase delay of a phase lock loop (PLL) in the demodulator of said receiver;
wherein said phase adjustment controller controls phase difference of a mixing carrier for each different digital code, so that said mixing carrier with phase delay is applied to the demodulation mixers in the demodulator;
wherein output data DM_RX from the demodulator is fed back to the phase adjustment controller;
wherein the phase adjustment controller checks if output data DM_RX matches a predefined phase adjust data pattern and records all check comparison results of the phase adjust data pattern; and wherein the phase adjustment controller compares check comparison results and asserts optimum phase delay to the PLL to maximize recovered signal strength.

11. A method of performing phase synchronization between modulation at a transmitter and demodulation at a receiver, the method comprising:

(a) sending a pre-defined data pattern and a set of digital codes from a transmission controller within a transmitter configured for multiple-frequency modulation of digital data into a multiple-frequency analog output;

(b) receiving said pre-defined data pattern and a set of digital codes at a phase adjustment controller within a receiver configured for demodulation of said multiple-frequency analog output from said transmitter into a digital output;

(c) adjusting phase delay of a phase-lock-loop (PLL) within said phase adjustment controller in response to said pre-defined data pattern and set of digital codes to generate a demodulation carrier to a demodulation mixer within the receiver;

(d) validating correctness of demodulation mixer output for each digital code within said set of digital codes; and (e) asserting correct phase adjustment within the phase adjustment controller to optimize the demodulation carrier for maximum recovered signal strength of the demodulator after testing all of said set of digital codes, whereby said demodulation in the receiver is then properly synchronized with modulation at the transmitter.

12. The method recited in claim 11, wherein said method provides synchronization without performing digital signal processing (DSP).

13. The method recited in claim 11, wherein said method provides synchronization between modulation and demodulation with reduced latency, or reduced power consumption, or a combination of reduced latency and reduced power consumption.

14. The method recited in claim 11, wherein said transmitter and said receiver are located on different integrated circuits which are interconnected.

15. The method recited in claim 11, wherein different integrated circuits are interconnected in response to connection of through-silicon-vias (TSVs) on their respective different integrated circuits.

16. The method recited in claim 11, wherein a phase delay arises due to signal propagation through various elements between mixers in the transmitter of a first integrated circuit and mixers in the receiver of a second integrated circuit.

17. The method recited in claim 11, wherein said method performs multiple-frequency modulation based on quadrature amplitude modulation (QAM) through-silicon via (TSV) links.

18. A method of performing phase synchronization between modulation at a transmitter and demodulation at a receiver, the method comprising:

(a) sending a pre-defined phase adjust data pattern from a transmission controller of a transmitter to be output from a modulation mixer of the transmitter;

(b) sending a set of digital codes from the transmission controller to a phase adjustment controller of a receiver, said set of digital codes adjust phase delay of a phase lock loop (PLL) in said phase adjustment controller;

(c) controlling phase difference of a mixing carrier of the receiver based on output of said phase lock loop (PLL) for each different digital code in the set of digital codes;

(d) applying mixing carrier with phase delay to a demodulation mixer of the receiver with demodulated output from the demodulation mixer fed back to the phase adjustment controller;

(e) checking demodulated output within the phase adjustment controller for matching with pre-defined phase adjust data and storing results; and (f) examining stored results after storing data for all pre-defined phase adjust data and selecting optimum phase delay for the PLL, controlling demodulation mixers in said demodulation circuit, to maximize recovered signal strength and thus to phase synchronize demodulation at the receiver with modulation at the transmitter.

19. The method recited in claim 18, wherein said phase adjustment cycle is performed periodically toward assuring proper phase synchronization between transmitter and receiver.

20. The method recited in claim 18, wherein phase synchronization between modulation and demodulation is achieved without digital signal processing (DSP).

* * * * *